Feb. 17, 1953 H. T. GRISWOLD 2,628,732
MACHINE FOR UNCASING BOTTLES AND JARS
Filed July 16, 1949 9 Sheets-Sheet 3

Inventor
H. T. GRISWOLD

By Rule and Hoge
Attorneys

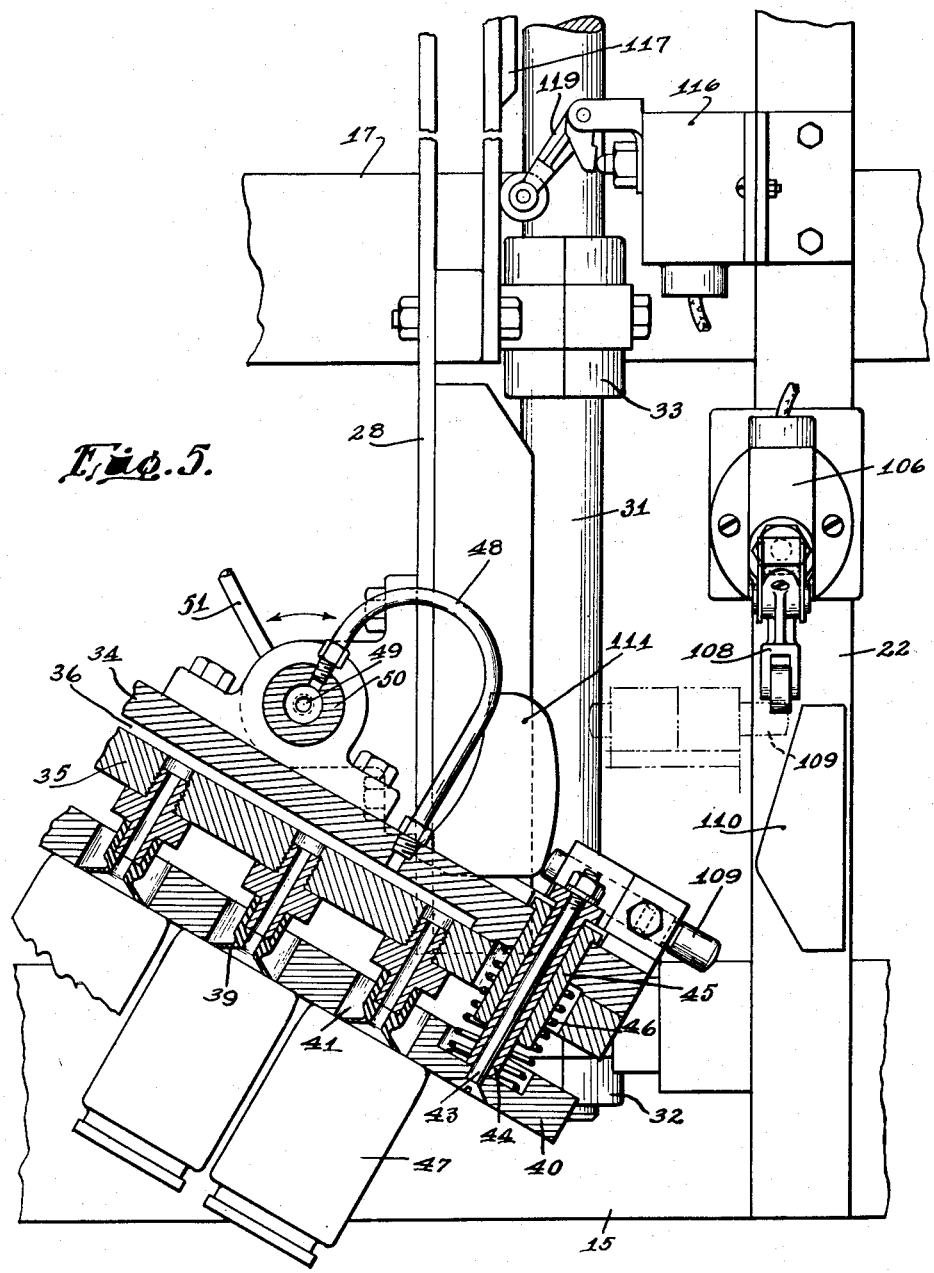

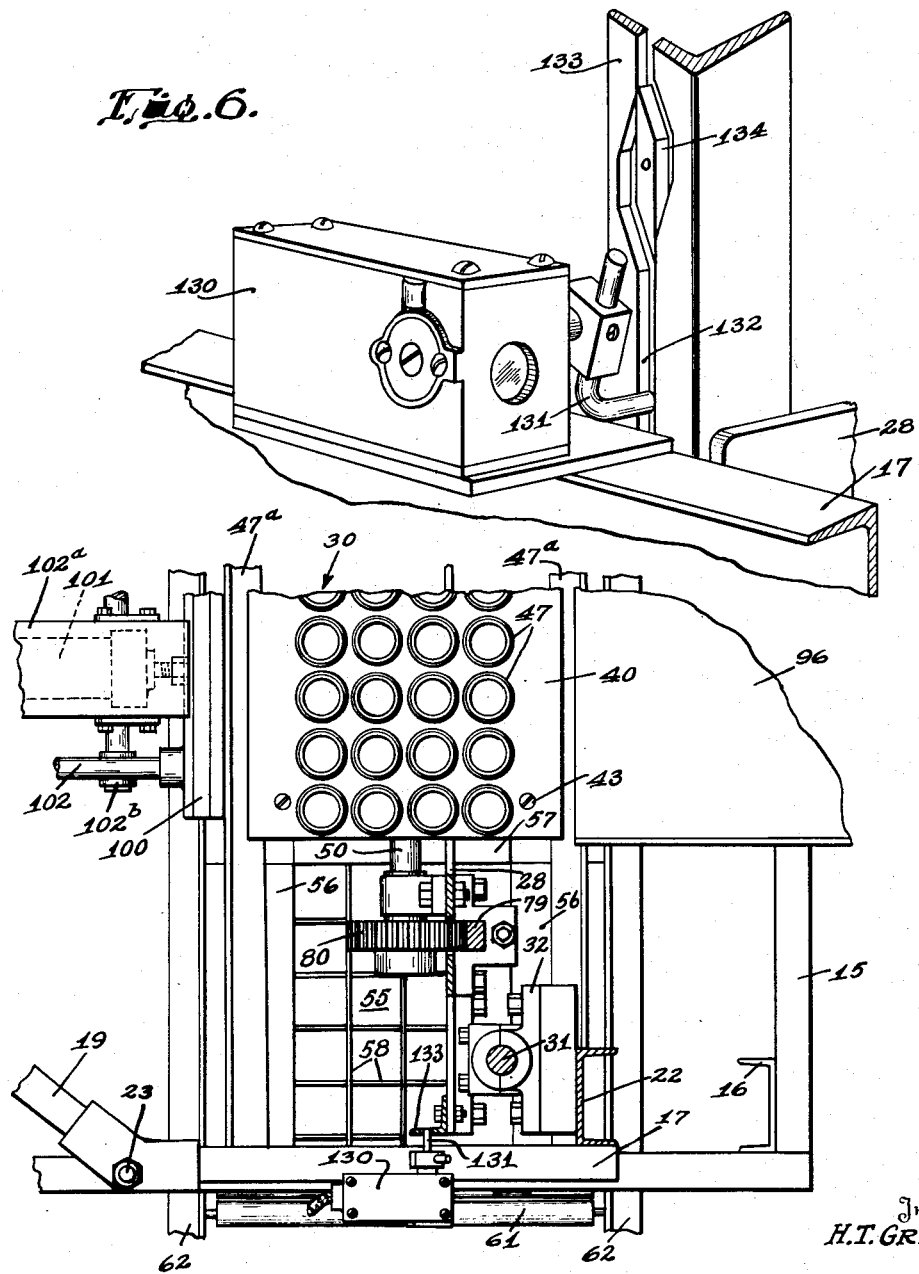

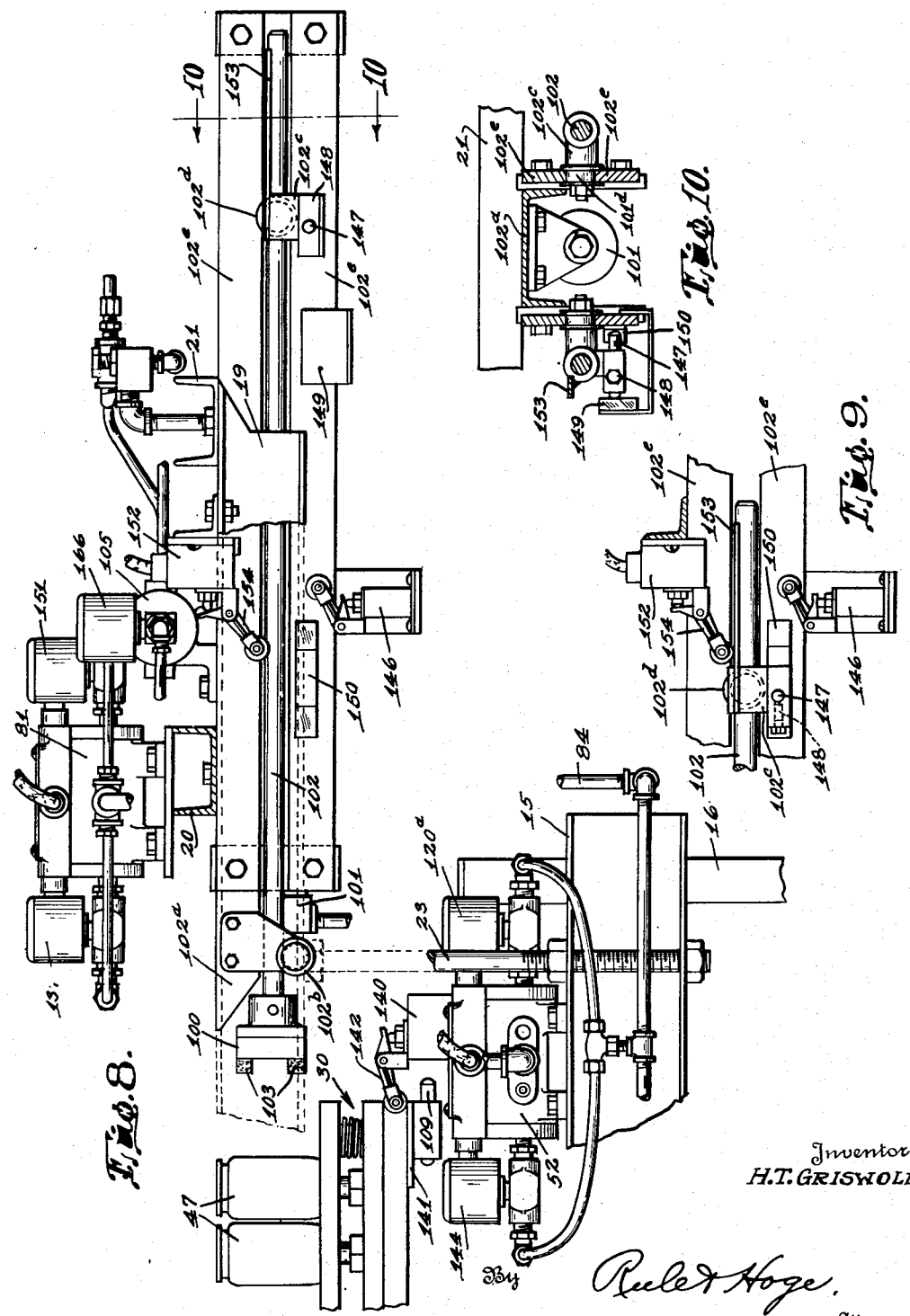

Feb. 17, 1953

H. T. GRISWOLD 2,628,732

MACHINE FOR UNCASING BOTTLES AND JARS

Filed July 16, 1949

Inventor
H.T. GRISWOLD

By Rule and Hoge.
Attorneys

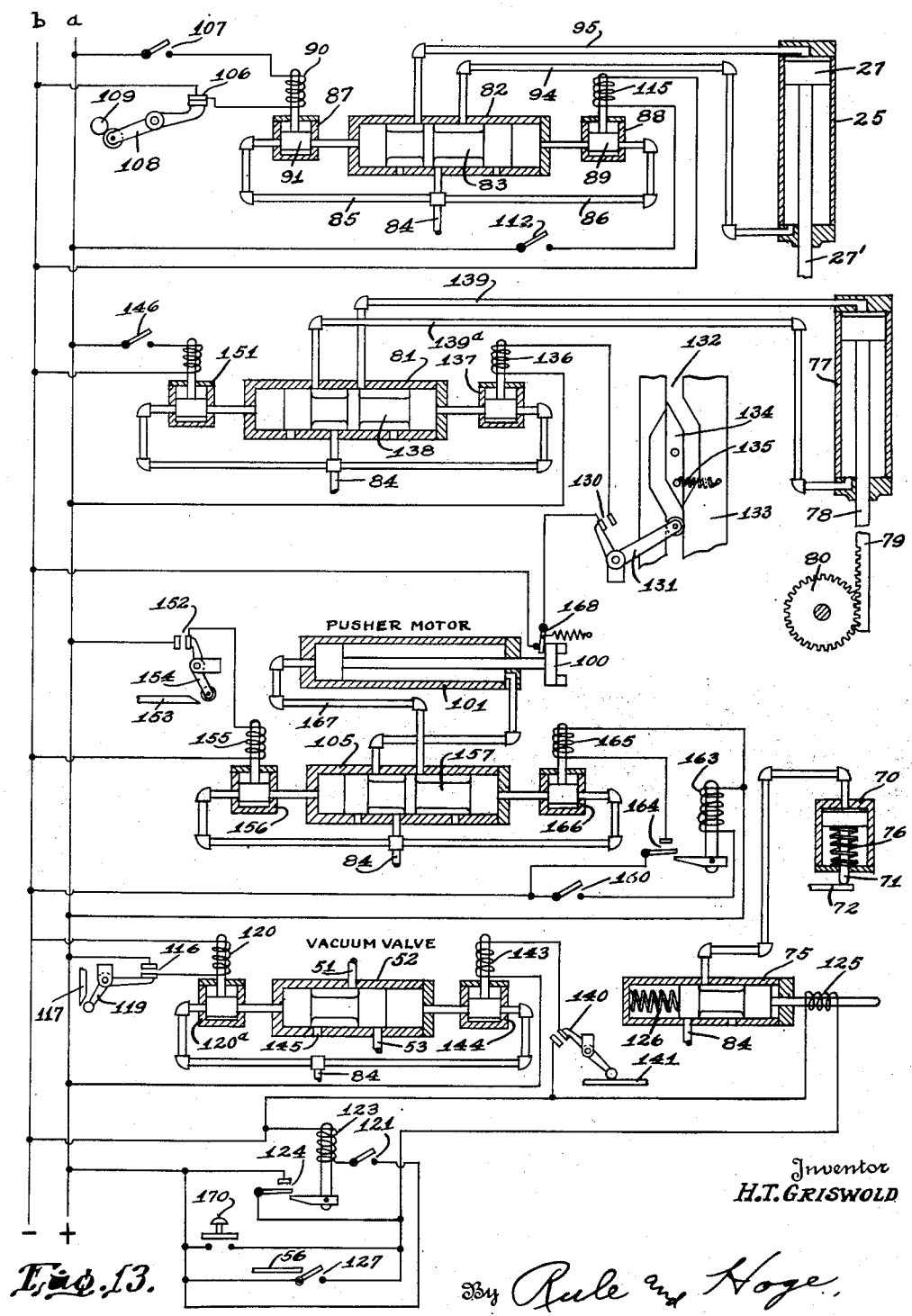

Patented Feb. 17, 1953

2,628,732

UNITED STATES PATENT OFFICE 2,628,732

MACHINE FOR UNCASING BOTTLES AND JARS

Hugh T. Griswold, San Francisco, Calif., assignor to Owens-Illinois Glass Company, a corporation of Ohio Application July 16, 1949, Serial No. 105,165

19 Claims. (Cl. 214—309)

My invention relates to mechanism for uncasing or removing bottles, jars, or other articles from the cases or cartons in which the articles are packed for shipping or storage.

The invention provides mechanism for automatically lifting from a carton, the bottles or jars packed therein, while the latter are in an inverted position and thereafter reinverting and discharging the articles in an upright position.

It is customary to pack bottles and jars, as they come from the annealing leer, in cartons made of foldable sheet material and comprising flaps for closing both the tops and bottoms of the cartons. The articles are packed in inverted position in the carton and the usual method of removing them is to withdraw the cartons upwardly from the articles while the latter are suitably supported in upright position. This method of uncasing or removing the open-mouth ware from the cartons permits dust, dirt, particles of glass, fragments of the carton material, and any other foreign matter which finds its way into the cartons, to fall into ware and remain there until removed by the usual washing mechanism. As a result, the discharge pipes of the washing machines are continually clogged with such materials in the water washed from the hollow ware. Further, the washing process cannot be relied on to remove all such foreign materials. The present invention provides means for overcoming these objections as the withdrawal of the open-mouth ware from the cartons while inverted, prevents the entrance or retention of such foreign matter within the ware.

My invention in its preferred form comprises horizontal conveying means for transporting cartons, each packed with open-mouth ware, for example, glass jars, and bringing the cartons in succession to the uncasing station at which each carton is arrested. A platen carrying a battery of suction cups is pivotally attached to a platen carriage to swing about a horizontal axis for inverting and reinverting the platen. The carriage is mounted for up-and-down movement and when lowered, brings the suction cups into contact with the bottom ends of the inverted jars. Suction is then applied to attach the jars to the platen and the platen carriage is lifted to withdraw the jars from the carton. Thereafter the platen is inverted to swing said jars to an upright position. A pusher bar is then advanced horizontally over the platen, thereby pushing the jars off the platen onto a platform or other receiving means.

The mechanism is power operated and in the form herein illustrated, air-operated piston motors are provided for lifting and lowering the platen carriage, for inverting and uprighting the platen, and for operating the pusher bar. Valves for controlling the air motors are under the control of electromagnets, the circuits of which include switches actuated automatically to effect the synchronized operation of the various motors and also controlling the application of suction to the vacuum cups. My invention further provides a novel form of stop mechanism for arresting the cartons at the uncasing station.

The precise nature of the invention and various features of novelty will be more fully understood from the following detailed description taken in connection with the accompaning drawings.

Referring to the drawings:

Fig. 5 is a part section elevational view on a comparatively large scale showing the platen and suction cups in an intermediate position during the rotation of the platen for uprighting the attached jars, the view also showing various electrical control devices.

Fig. 6 is a perspective view of the switch which controls the rotation of the platen to upright position, and means for actuating the switch.

Fig. 7 is a fragmentary part sectional plan view showing the platen and its rotating mechanism.

Fig. 8 is a fragmentary elevational view showing the platen, pusher bar, platen rotating control valve mechanism, the vacuum control valve mechanism and various switches and their operating cams.

Fig. 9 is a fragmentary elevational view showing the switch which controls the return rotation of the platen to neutral position and the switch controlling the return movement of the pusher bar.

Fig. 10 is a section at the line 10—10 on Fig. 8.

including stop bar, its actuating air motor, and solenoid actuated valve for the air motor.

Figure 12:
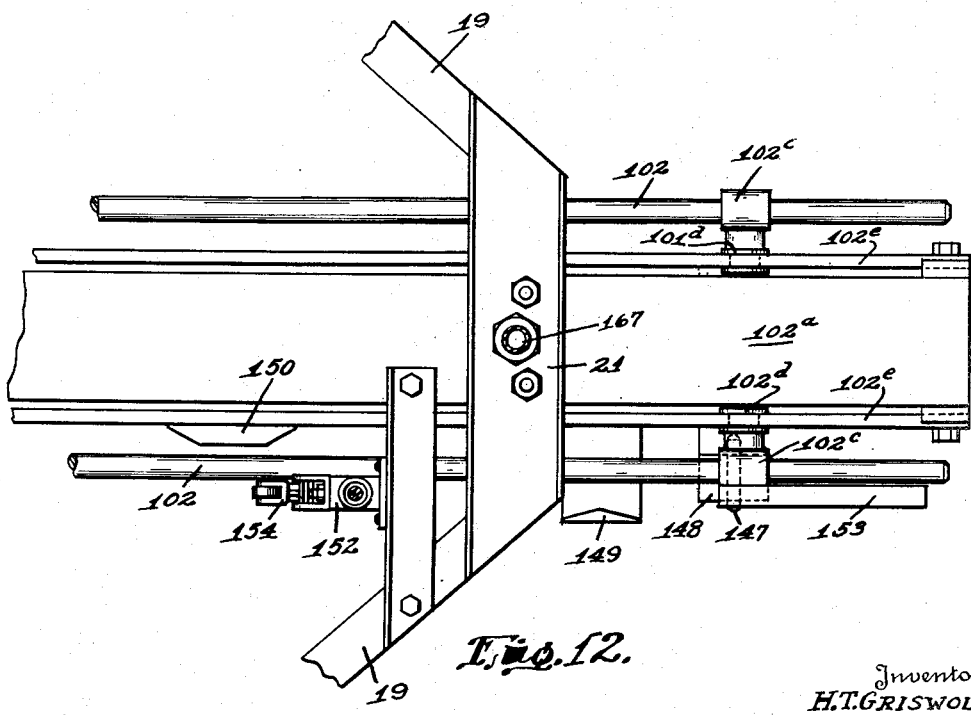

Fig. 12 is a fragmentary plan view showing a portion of the supporting structure and guide rails for the pusher bar and switch control devices actuated by the movement of the pusher bar.

Fig. 13 is a diagrammatic view showing the air motors, their control valves, the vacuum control valve, and the electrical control system.

Referring to Figs. 1 to 4, the operating parts of the machine are supported on a framework including a horizontal rectangular open frame 15 mounted on legs 16. Spaced above the frame 15 is an upper horizontal open frame comprising side bars or members 17 with convergent extensions 19 to which are attached cross-bars 20 and 21. The upper frame bars 17 are supported in part by uprights 22 and in part by vertical rods 23. The frame members 22 are extended upwardly beyond the frame 17 and are connected at their upper ends by a cross beam 24 on which is mounted a piston motor 25.

The motor 25 is attached at its upper end to a frame member 26 extending upwardly from the cross beam 24. The motor comprises a vertically reciprocating piston 27 (Fig. 13) and piston rod 27' (Fig. 1) connected to a platen carriage 28 in the form of a yoke mounted for up-and-down movement in the machine frame. The motor 25 serves as a lifting motor for bodily lifting and lowering the platen 30 which is mounted thereon to swing about a horizontal axis. The yoke 28 is supported and guided on stationary vertical guide rods 31, the latter attached by clamping blocks 32 at their upper and lower ends to the stationary framework. The yoke 28 is provided with bearing sleeves 33 slideable on the rods 31.

The platen 30 (Figs. 1 to 6) comprises a pair of flat rectangular plates 34 and 35 juxtaposed one over the other and sealed together. The plate 34 (Fig. 5) is recessed to provide a vacuum chamber 36 from which air may be exhausted for applying suction to a battery of suction cups 39 mounted on the plate 35, the cups being made of rubber or other resilient compressible material. The platen includes a third plate 40 parallel with the plates 34 and 35 and spaced therefrom, the plate 40 being formed with openings 41 into and through which the vacuum cups extend.

Figure 4:
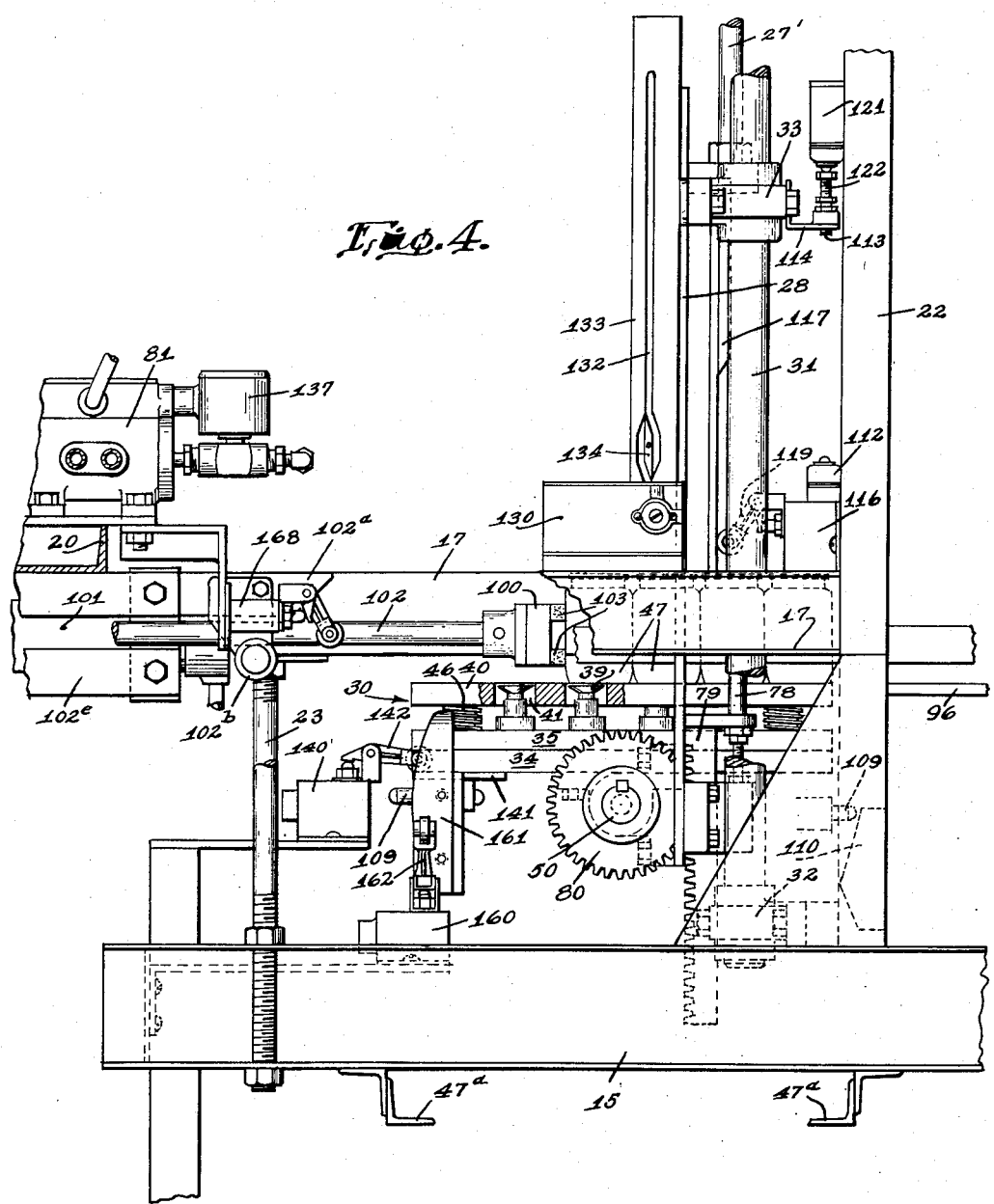
Fig. 4 is a view similar to a portion of Fig. 2, but on a larger scale and showing the platen lifted and inverted to bring the jars to upright position, and the pusher bar pushing the jars off the platen.

The plate 40 is yieldingly mounted for limited movement toward and from the plate 35 for the purpose hereinafter explained. The connections between the plate 40 and the plates 34, 35 include screw bolts 43 on each of which is mounted a sleeve 44 or tubular rod, the latter in turn extending through a bushing 45 attached to the plate 34. A coil spring 46 surrounding the bushing 45 is held under compression between the plates 34 and 40. With this construction the plate 40 is yieldingly held in its extended position in which the outer face of the plate is spaced a short distance beyond the mouths of the vacuum cups as shown in Fig. 4.

When the platen carriage is moved downward to bring the suction cups into engagement with the articles 47, herein shown as glass jars, the plate 40 is arrested shortly before the carriage has completed its downward movement, by a cradle 47a. This cradle, consisting of angle bars, is attached to the frame 15 in position to receive the plate 40 and arrest it just before the suction cups are brought into sealing contact with the jars 47. During the final downward movement of the carriage after the plate 40 is arrested, the suction cups make sealing contact with the jars, and the plate 40 is caused to bear against the cradle 47a with a pressure determined by the expansive force of the springs 46. When the suction has been applied for holding the jars and the platen is lifted, the plate 40 under the expansive force of the springs, bears against the jars and rigidly holds them against any tilting movement. The vacuum or suction line extends from vacuum chamber 36 through a pipe 48, a central bore 49 in a shaft 50, a vacuum pipe 51 leading to a vacuum control valve 52 (Fig. 13) and through the valve to a vacuum pipe 53 extending to a suction pump or other air exhausting means (not shown).

Figure 1:
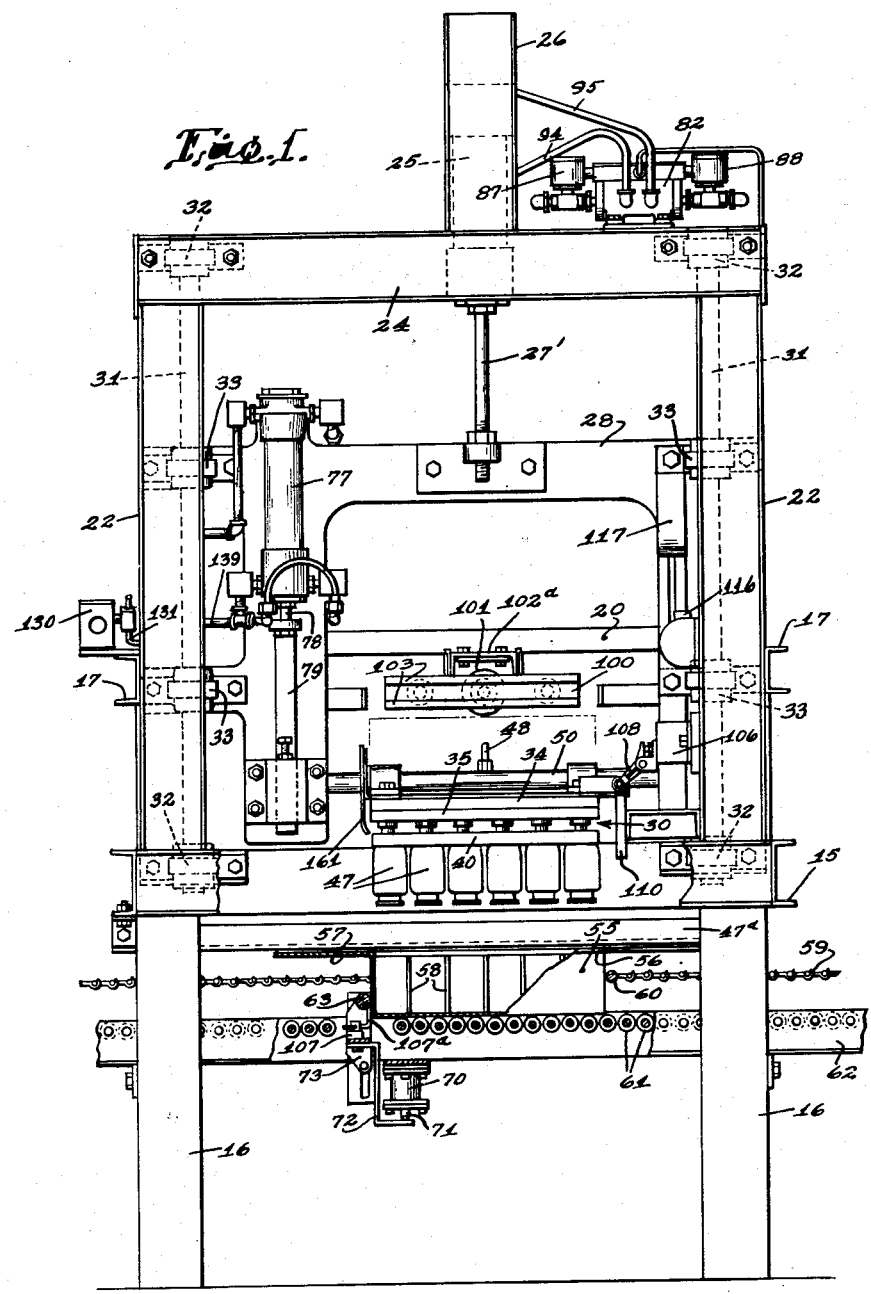
Fig. 1 is an elevational view of the machine, parts being broken away and parts shown in section.
Figure 2:
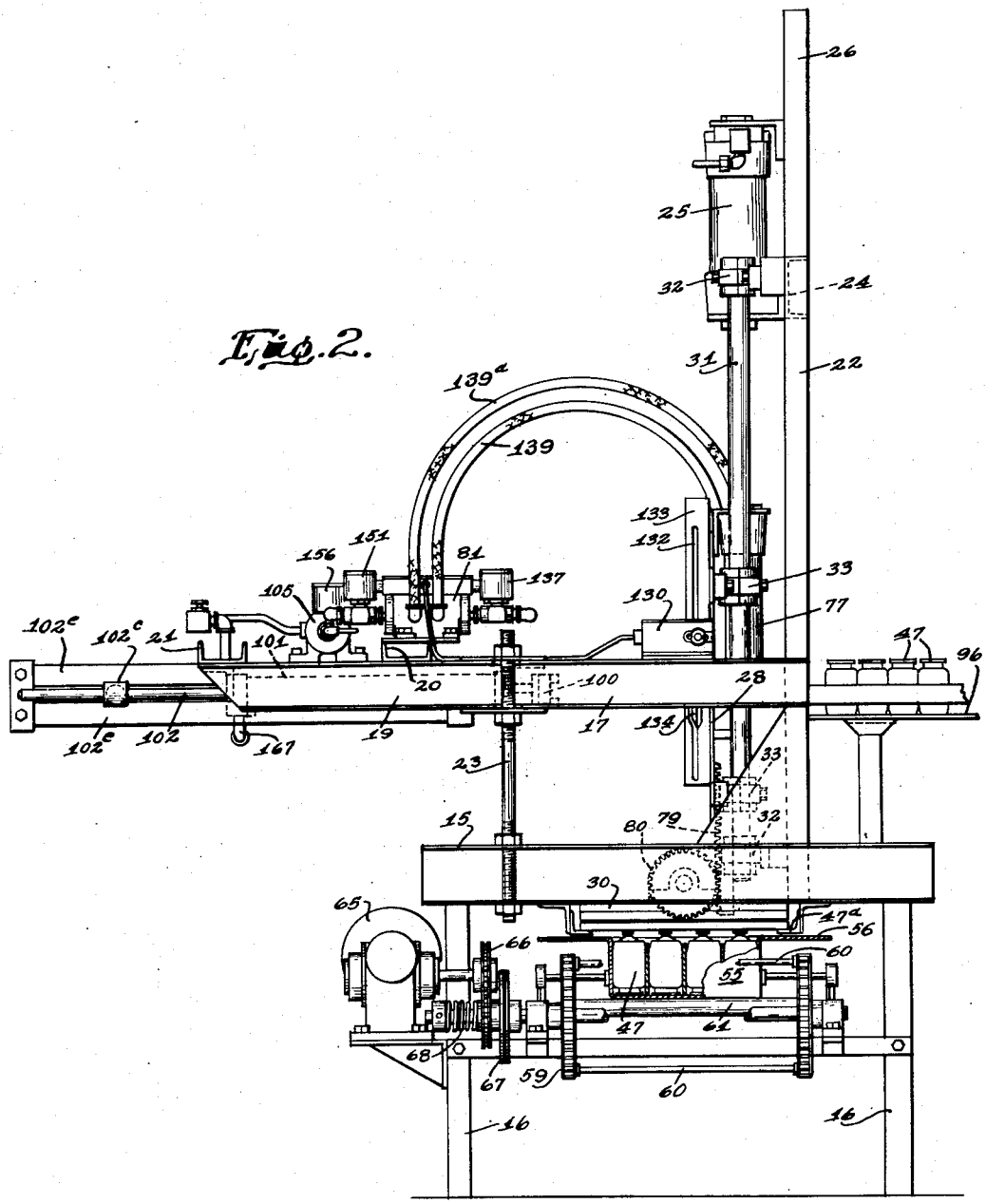
Fig. 2 is a similar view looking in a direction at right angles to that of Fig. 1 and shows the suction platen lowered.
Figure 3:
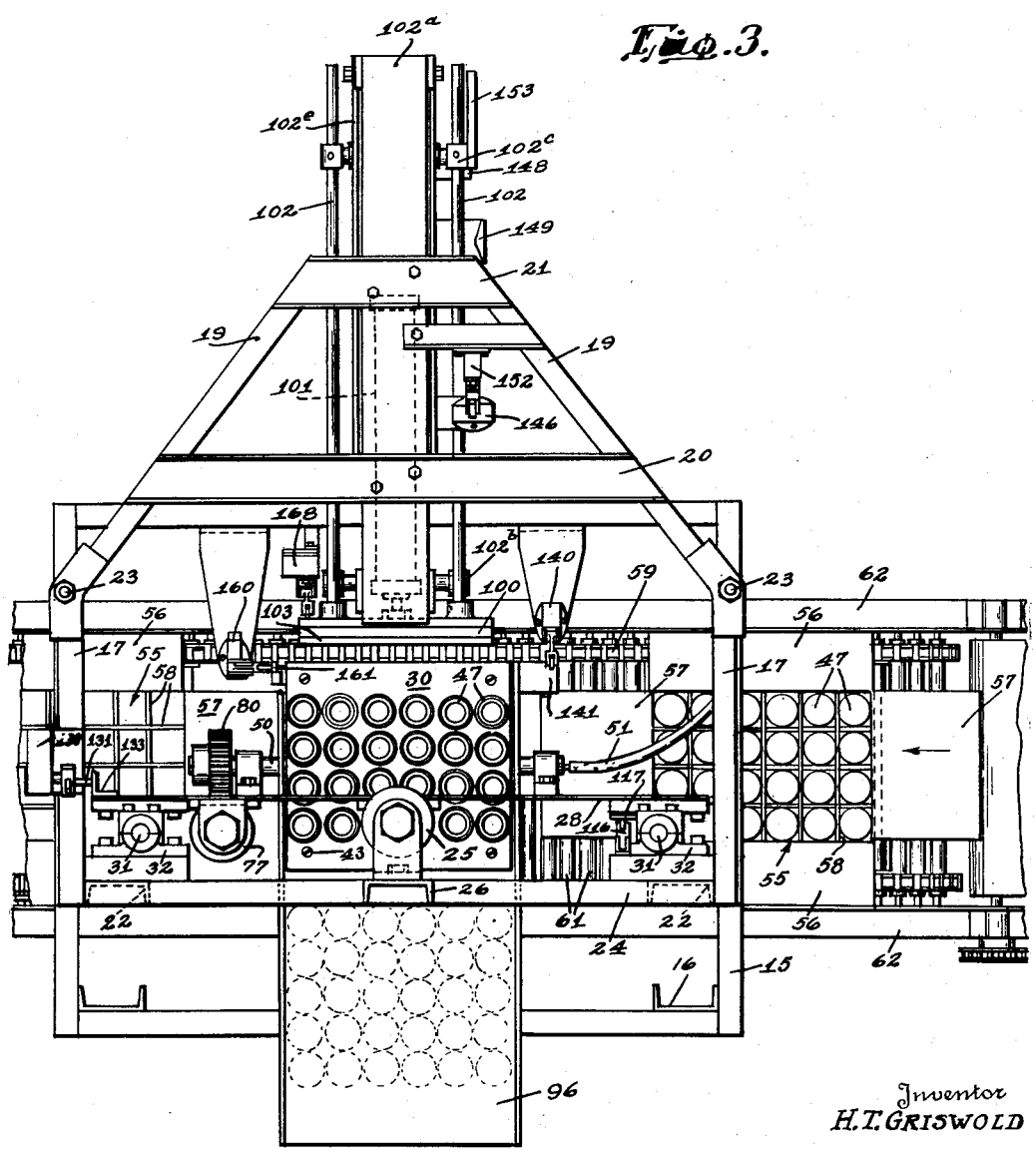
Fig. 3 is a plan view of the machine.

The jars 47 which are to be uncased, are packed in cartons 55 (Figs. 1, 2 and 3). The cartons may be of conventional construction, being made of foldable paperboard or the like, and comprising upper side flaps 56 and end flaps 57 which, as shown in Figs. 1 and 3, are folded back to open position for exposing the jars 47 which are carried upside down in the cells formed by spacing strips 58. The cartons are brought to the uncasing station by conveyor mechanism comprising a flight bar conveyor 59. The conveyor consists of a pair of horizontally spaced endless chains carrying transverse flight bars 60 which engage behind the cartons and drive them forward while supported on a series of rolls 61 journaled in the conveyor frame 62.

Figure 11:
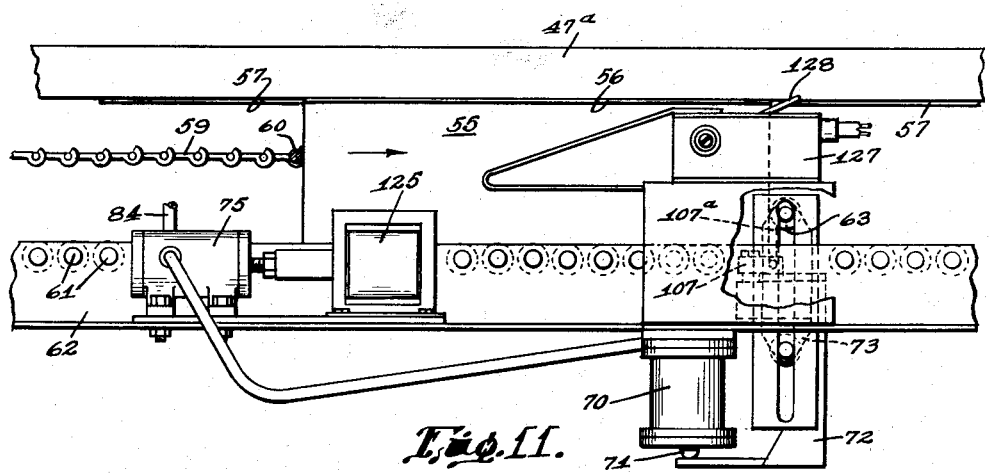
Fig. 11 is an elevational view showing the carton conveyor and stop mechanism for the carton.

Each carton is arrested at the uncasing station by a stop bar 63 (Figs. 1 and 11). The flight bar conveyor is driven by a motor 65 (Fig. 2) operating through a train of gearing 66 including a friction clutch 67. The clutch comprises a pair of friction disks held in frictional driving engagement by a coil spring 68, permitting the conveyor to be arrested when a carton is arrested by the stop bar 63.

When a carton is brought to rest at the uncasing station, the platen 30 is operated to withdraw the jars from the carton, followed by certain other operations to complete the cycle, as hereinafter described. The stop bar 63 is withdrawn downward to release the empty carton and permit the flight bar conveyor to resume its travel for bringing the next succeeding carton to the uncasing station. The means for withdrawing the stop bar 63 includes an air-operated piston motor 70 (Figs. 1, 11 and 13). The motor piston rod 71 operates through an arm 72 attached to a bracket 73 carrying the stop bar 63 to pull the latter downward below the path of the carton when the motor piston moves downward, thereby permitting the conveyor 59 to resume its travel and carry the empty carton forward. The motor 70 is under the control of a valve 75 (Figs. 11 and 13) operated, as hereinafter described, in a manner to hold the stop bar 63 in its lowered position until the empty carton has advanced to a position entirely beyond the stop bar, the latter then being returned by means of a coil spring 76 to its operative position for arresting the next succeeding carton.

When the motor 25 has lowered the carriage 28 and platen 30, to bring the suction cups into contact with the jars 47, suction is applied and the carriage is then raised to withdraw the jars from the carton. When the jars have been elevated sufficiently to clear the carton, the platen is inverted by rotating it about the axis of the shaft 50 and thereby swings the jars to an upright position. The means for rotating the platen includes a piston motor 77 mounted on the carriage 28. The piston rod 78 of the motor is attached to a vertical rack bar 79 in mesh with a gear wheel 80 keyed to the shaft 50, the latter being fixed to the platen 30 and journaled in bearings on the carriage 28. The motor 77 is under the control of a valve 81 (Fig. 13).

The motor 25 for lifting the platen is under the control of a spool-type control valve 82 (Figs. 1 and 13) of conventional construction. The valve piston 83 is actuated by air pressure supplied through a pressure pipe 84 and branch pipes 85 and 86 which extend from the pipe 84 to poppet valves 87 and 88 respectively. The valve 87 is actuated by a solenoid 90 which when energized, lifts the valve disk 91 and admits air under pressure to the lefthand end of the main valve 82 for moving the valve piston 83 to the right. With the parts in the position shown, air under pressure is supplied through the valve 82 and a pipe 94 leading to the lower end of the lifting motor cylinder 25 so that the motor piston has been moved thereby to its upper position. When the valve piston 83 is moved to the right as above described, air pressure is supplied through the valve and a pipe 95 to the upper end of the motor cylinder for lowering the platen carriage 28 and platen 30.

After the platen has operated as above described, to withdraw the jars from a carton and swing them to upright position, the vacuum is dissipated (as hereinafter described) thereby releasing the jars from the grip of the suction cups so that the plate 40 is moved upward by the springs 46 and lifts the jars off the suction cups, and the jars are then moved off the platen onto a platform 96 (Figs. 3 and 7) or other receiver. Means for transferring the jars from the platen comprises a pusher bar 100 which is attached to the forward ends of a pair of parallel horizontal rods 102 mounted for lengthwise reciprocating movement in a frame 102ᵃ bolted to the frame members 20 and 21 (Figs. 3 and 8). The rods 102 are supported adjacent their forward ends on rolls 102ᵇ journalled in brackets at the forward end of the frame 102ᵃ. Collars 102ᶜ (Figs. 8 and 12) are attached to the rods 102 near the rear ends thereof and carry rollers 102ᵈ which run on rails 102ᵉ forming part of the frame 102ᵃ. The pusher bar is reciprocated by a horizontally disposed piston motor 101 mounted in a frame 102ᵃ and extending lengthwise thereof. The motor piston rod is connected directly to the pusher bar 100. Pads or strips 103 of rubber or similar cushioning material are mounted on the pusher bar. The pusher motor 101 is under the control of a valve 105 which may be of the same construction as the valves 81 and 82.

The air motors and valve mechanism are operated automatically and in synchronism under the control of the system of electrical switches and contact devices which will now be described, followed by a description of a cycle of operations.

Referring to Fig. 13, the various electromagnets are operated by current supplied through the mains a and b. The electromagnet 90 which when energized, operates to initiate the down stroke of the motor 25 for lowering the platen carriage, has switches 106 and 107 in circuit therewith. The switch 106 (Fig. 5) has a stationary mounting on the frame member 22 and its operating arm 108 is actuated by a detent rod 109 mounted on the platen. The switch 106 is closed by the rod 109 as the empty platen swings to its horizontal inverted position with the suction cups projected downward and the carriage 28 in its uppermost position. Such inverting movement brings the rod 109 to the broken line position 109'. When the platen is being moved bodily upward carrying with it the jars 47, a stationary cam 110 in the path of the rod 109, moves the latter to the left so that it does not contact the switch arm 108 during such upward movement. When the platen is swung about the axis of the shaft 50, a cam 111 on the platen carriage 28 engages the rod 109 and shifts it to the right into position for closing the switch 106 as above described.

The switch 107 (Figs. 1, 11 and 13) has an arm 107ᵃ (Fig. 1) projecting upward into the path of the cartons, and is moved to close the switch as a carton is nearing the stop bar 63.

A switch 112 (Fig. 4) controls the up stroke of the motor 25. This switch has a stationary mounting on the frame member 22 and is actuated by a stop rod 113 attached by a bracket 114 to the platen carriage 28. The switch 112 is operated during the final downward movement of the carriage. Referring to Fig. 13, the switch 112 when closed, makes a circuit for the solenoid 115 so that the poppet valve 89 is opened and the valve spool 83 is moved to the left to the position shown, thereby supplying air pressure to the pipe 94 for lifting the motor piston.

A switch 116 (Figs. 4, 5, and 13) mounted on the frame member 22 controls the vacuumizing of the platen. The switch is closed by a cam 117 on the carriage 28 in position to actuate the switch arm 119 when the platen has nearly reached its lowered position with the suction cups in contact with the jars 47. Closing of the switch 116 energizes the solenoid 120 of a poppet valve 120ᵃ thereby supplying air pressure to the valve 52 and moving its valve spool to the right, thus connecting the suction pipe 53 to the pipe 51 leading to the vacuum chamber 36 (Fig. 5).

A switch 121 (Fig. 4) mounted on the frame member 22 is closed by a contact screw 122 as the carriage reaches its limit of upward movement, and thereby completes a circuit for a solenoid 123 (Fig. 13) which then closes a time delay switch 124 in circuit with a valve solenoid 125. When the latter is energized it moves the valve piston of the valve 75 against the expansive force of a coil spring 126 and thereby opens the air pressure line 84 to the piston motor 70 which then operates to lower the stop bar 63.

When the stop bar 63 is lowered, the carton 55 from which the jars have been removed, commences its forward movement from the uncasing position and immediately actuates a switch 127 (Figs. 11 and 13). The closing of the switch is effected by the carton flap 56 which engages the switch-operating arm 128, thereby holding the switch closed until the empty carton has passed beyond the stop bar 63. As the switch 127 is in parallel with the switch 124, it maintains the circuit for the solenoid 125 independently of the switch 124, thus preventing the air motor 70 from lifting the stop bar while the carton is passing over it.

The platen, after it has been lifted with its load of jars, is rotated to upright position under the control of a switch 130 (Figs. 4, 6, 7, and 13) mounted on the machine frame. The switch is actuated by means of a rock arm 131 which projects into a vertical guide slot 132 in an angle bar 133 mounted on the carriage for up-and-down movement therewith. The arm 131 is rocked to close the switch by a pivoted cam 134 held in position by a spring 135 (Fig. 13). When the carriage moves downward the arm 131 passes the lefthand side of the member 134 without closing the switch 130. When the carriage is completing its upward movement, the switch arm 131 is guided to the righthand side of the cam 134 and thereby is rocked in a direction to close the switch 130. This makes a circuit for a solenoid 136 and opens a poppet valve 137 so that air pressure is supplied to the valve 81 and moves the valve spool 138 to the left. This supplies air pressure through the valve 81 and a pipe 139 to the upper end of the piston motor 77 and thereby causes the motor to rotate the platen for uprighting the ware.

As the platen completes its rotation to horizontal position for uprighting the ware, it actuates a switch 140 (Figs. 3, 4, and 8) which serves to release the vacuum. A bracket 141 on the platen operates through an arm 142 to close the switch 140. This completes a circuit for the solenoid 143 and thereby opens a poppet valve 144 and supplies air pressure to move the spool of the valve 52 to the position shown, thereby admitting air through a port 145 and the pipe 51 for dissipating the vacuum.

The return rotation of the platen to its neutral, downwardly facing position is controlled by a switch 146 (Figs. 8, 9, and 13). This switch must remain open during the forward movement of the pusher bar and is moved to closed position during the return movement of the pusher bar. The switch is actuated by a detent pin 147 which is mounted in one of the brackets 102ᶜ (Figs. 8 to 10) and is shifted into inoperative position by a stationary cam 149 during the forward stroke of the pusher bar. The pin 147 is held in its shifted position by a spring detent 148. After the pin 147 passes the switch 146 it is shifted to operative position by a cam 150 so that during the return movement of the pusher bar it closes the switch 146. Closing of the switch 146 energizes the magnet coil of valve 151, opens said valve, and moves the valve spool 138 to the right so that air pressure is supplied through a pipe 139ᵃ to the lower end of the motor 77.

The return movement of the pusher bar 100 to its retracted position (Fig. 8) is under the control of a switch 152 (Figs. 3, 8, 9, and 13). As the pusher bar is completing its forward movement for ejecting the ware from the platen, a switch-operating member 153 on one of the rods 102, actuates the switch arm 154, and thereby closes the switch 152. This completes the circuit for a solenoid 155 and opens the valve 156 thereby moving the valve spool 157 to the right so that air pressure is supplied to the forward end of the motor 101. The pusher bar is thus retracted immediately after it completes its forward movement.

The forward stroke of the pusher bar is under the control of a switch 160 (Figs. 3, 4, and 13). The switch 160 is closed by a cam 161 mounted on the platen in position to engage the switch arm 162 and close the switch as the platen completes its rotation for uprighting the ware. The closing of the switch 160 completes a circuit through the coil 163 of a single impulse relay which operates to momentarily close a switch 164. This completes the circuit for the solenoid 165 of the poppet valve 166 which is thus lifted and admits air pressure to the valve 105 so that the valve spool 157 is moved to the left and supplies air through the pipe 167 to the motor 101, causing the forward stroke of the pusher bar. This forward movement of the pusher bar may commence before the platen has quite reached its horizontal position, thereby saving time which would otherwise be required for the pusher bar to cover the distance required for clearance between the ware and the pusher bar. An interlocking switch 168 (Figs. 4 and 13) is mounted with its operating arm in the path of the pusher bar 100 in position to be closed as the pusher bar completes its retracted movement. The switch 168 is in circuit with the solenoid 136 so that said circuit cannot be completed for causing the platen to rotate and upright the ware except while the pusher bar is in its fully retracted position.

Operation

The sequence of operations for uncasing a carton of jars will be described as follows, by reference to the diagram (Fig. 13), which indicates the positions of parts just before the uncasing operations commence. The pistons of the lifting motor 25 and the platen rotating motor 77 are in their up position with the platen in neutral position, viz., in its upper position with the suction cups facing downward.

As a carton is brought to the uncasing station by the flight conveyor, it closes the switch 107, thereby energizing the solenoid 90 so that it lifts the poppet valve and supplies air pressure to the control valve 82 for moving its valve spool 83 to the right. This supplies air pressure to the top of the motor 25 and moves its piston downward and thus lowers the platen, bringing the suction cups into engagement with the jars.

During the final downward movement of the platen, the vacuum valve switch 116 is closed so that the solenoid 120 operates its poppet valve and supplies air pressure to the vacuum valve 52 for moving the valve spool to the right. This opens the suction pipe 53 to the pipe 51 leading to the platen and vacuumizes the platen so that the jars are gripped by the suction cups. During the final downward movement of the platen carriage, the switch 112, controling the up movement of the motor 25, is also closed, thereby making a circuit for the poppet valve solenoid 115 so that its valve is lifted, the control valve spool 83 is returned to the lift and air pressure supplied to the lower end of the motor 25. This causes the motor to lift the platen carriage 28 so that the jars are withdrawn upwardly from the carton.

As the carriage moves upward, the switch 130 is closed, making a circuit for the coil 136, thereby causing the poppet valve to be lifted and the valve spool 138 to be moved to the left so that air pressure is supplied to the upper end of the platen rotating motor 77. Thereupon the motor piston is moved downward and through the rack 79 and pinion 80, rotates the platen and jars through 180°, thereby uprighting the jars.

As the platen is completing such rotation, it closes the switch 140 which controls the vacuum release and the switch 160 which controls the forward movement of the pusher bar. The switch 140 when closed makes a circuit for the solenoid 143, lifts the poppet valve and supplies air pressure to the vacuum valve 52, moving the valve spool to the left and thus closing the vacuum pipe 53 and opening the pipe 51 to an air port 145, thus dissipating the vacuum and releasing the suction cups. This permits the spring 46 to expand and lift the plate 40 a short distance so that the jars are separated from the suction cups and supported entirely by the plate 40. The switch 160 when closed makes a circuit for the coil 163 which operates through the time-delay switch 164 to make a circuit for the coil 165 so that the poppet valve is lifted and the valve spool 157 shifted to the left. This supplies air pressure through pipe 167 to the pusher bar motor and moves the pusher bar forward over the platen for transferring the jars to the platform 96 (Fig. 3). As the pusher bar nears its forward position, it closes the switch 152, thereby energizing coil 155, lifting its poppet valve and returning spool valve 157 to the right so that air pressure is supplied to the forward end of the motor 101 and retracts the pusher bar.

As the pusher bar nears its retracted position, it closes the switch 146 which controls the up movement of the platen rotating motor 77. That is, closing of the switch 146 causes the valve spool 138 to be moved to the right so that the piston of the motor 77 is moved upward and rotates the empty platen back to its neutral position with the suction cups facing downward.

The up movement of the carriage lifting motor 25 closes the switches 106 and 121. The closing of switch 121 makes a circuit for solenoid 123 so that the latter operates to close the time-delay switch 124 and thereby makes a circuit for the solenoid 125 and moves the valve piston of valve 75 to the left. This supplies air pressure to the motor 70 so that it operates to lower the stop bar 63 (Fig. 11) and permits the flight bar conveyor to advance the empty carton away from the uncasing station. As soon as the carton starts forward, its flap 56 closes the switch 127 so that air pressure is maintained to the motor 70 and prevents the stop bar from being lifted while the carton is passing thereover. This completes the cycle. A push button switch 170, in parallel with the switch 127, may be operated manually to lower the stop bar 63.

Modifications may be resorted to within the spirit and scope of the invention as defined in the appended claims.

I claim:

1. Apparatus for uncasing articles from cartons, comprising a battery of article-gripping devices, a carrier on which the gripping devices are mounted, a horizontal conveyor on which the cartons are supported, said conveyor being mounted to travel horizontally and bring the cartons singly and in succession to an uncasing station, means positioned to arrest each carton at the uncasing station, automatic means for driving the conveyor intermittently and thereby advancing a succession of the cartons, means cooperating with the cartons to arrest the conveyor as each carton is arrested at the uncasing station, said carrier being mounted for up-and-down movement over each carton at said station, means for lowering the carrier and causing said gripping devices to grip the upper ends of the articles in the carton, means for then lifting the carrier and withdrawing the articles from the carton while suspended from the gripping devices, means for then rotating the carrier about a horizontal axis and thereby inverting said articles by the force applied thereto through the gripping devices and with the articles unsupported except at said ends, and means for releasing the articles from the gripping devices.

2. The combination with the apparatus defined in claim 1 of a pusher device, and automatic means for moving said pusher device transversely over said carrier and thereby removing the articles therefrom.

3. The apparatus defined in claim 1, the means for driving the conveyor comprising a motor and gearing including a friction clutch between the motor and the conveyor, the means for arresting the cartons comprising a stop in the path of the cartons by which each carton is arrested at the uncasing station, flights on the conveyor in position to be arrested by a carton at the uncasing station and thereby arrest said conveyor, and automatic means for withdrawing said stop after the articles have been withdrawn from the carton.

4. Apparatus for uncasing articles from cartons comprising a horizontally traveling conveyor by which the cartons are conveyed horizontally to and beyond an uncasing station, a continuously running motor for driving the conveyor, means including a friction clutch forming a driving connection between the motor and the conveyor, a stop in the path of the cartons in position to arrest each of the cartons in succession at the uncasing station, a battery of gripping devices, a carrier on which said devices are mounted, a carriage on which the said carrier is mounted for rotation about an axis, said carriage being mounted for up-and-down movement over the carton at said station, a motor operatively connected to the carriage for moving the latter up and down, a carrier motor mounted on the carriage and geared to the said carrier for effecting said rotation, means for causing said gripping devices to grip the articles in the carton at said station when the carriage is lowered, means for causing said carrier motor to rotate the carrier when the carriage has been moved upward and the articles withdrawn from the carton, and thereby inverting the said articles, and automatic means for discharging the inverted articles.

5. Uncasing apparatus comprising a horizontally disposed horizontally travelling conveyor by which cases or cartons with articles packed therein are brought in succession to an uncasing station, a platen mounted over the path of the cartons, suction cups carried by the platen, means for lowering the platen and bringing the suction cups into engagement with the articles in a carton at said station, and thereafter raising the platen and withdrawing the articles from the carton, means for rotating the platen about a horizontal axis with the articles carried thereby and thereby uprighting said articles, said platen including a supporting plate, means for moving the supporting plate relative to the suction cups into a position to separate the cups from the uprighted articles and hold the latter supported in upright position on said plate, a pusher bar mounted for horizontal reciprocation in a direction transverse to the direction of movement of the said conveyor, and automatic means for advancing said pusher bar over the platen with the uprighted articles thereon and thereby removing said articles from the platen.

6. Uncasing apparatus for removing from a carton articles packed therein in inverted position and uprighting the articles, said apparatus comprising a carriage mounted for up-and-down movement at an uncasing station, a platen mounted on the carriage for oscillating movement about a horizontal axis for inverting and re-inverting the platen, a battery of suction cups mounted on the platen, said platen including a supporting plate for the articles, a pusher device movable transversely over the platen, a vacuum control valve, means controlled thereby for periodically applying suction to the suction cups, fluid operated motors including a lifting motor geared to the carriage, a platen inverting motor geared to the platen, a pusher motor geared to the pusher device, valves individual to said motors and controlling their operations, electro-responsive devices for actuating the valves, switches in circuit with said electro-responsive devices and means for operating said switches automatically in a predetermined order and time relation by which the following sequence of operations is effected, viz., lowering the carriage and bringing the suction cups into engagement with the articles in the carton, actuating the vacuum valve and applying suction by which the suction cups are attached to said articles, lifting the carriage and thereby withdrawing the inverted articles from the carton, rotating the platen from a downwardly facing position and thereby uprighting the articles, dissipating the vacuum and thereby releasing the suction cups, moving said supporting plate upwardly and thereby lifting the articles off the suction cups, actuating said pusher device and thereby removing the articles from the platen, and rotating the platen back to its said downwardly facing position.

7. In combination with the apparatus defined in claim 6, automatic means for bringing cartons in succession to the uncasing station, means for arresting the cartons at said station, and automatic means operated by the movement of a carton into uncasing position at said station to initiate the said series of uncasing operations.

8. Uncasing apparatus for removing from a carbon articles packed therein in inverted position and uprighting the articles, said apparatus comprising a carriage mounted for up-and-down movement at a uncasing station, a platen mounted on the carriage for oscillating movement about a horizontal axis for inverting and re-inverting the platen, a battery of suction cups mounted on the platen, a pusher device movable transversely over the platen, a vacuum control valve, means controlled thereby for periodically applying suction to the vacuum cups, fluid operated motors including a lifting motor geared to the carriage, a platen inverting motor geared to the platen, a pusher motor geared to the pusher device, valves individual to said motors and controlling their operations, electro-responsive devices for actuating the valves, switches in circuit with said electro-responsive devices including a switch mounted in the path of movement of the carton to the uncasing station and actuated thereby to energize the lifting motor and lower the carriage and bring the suction cups into engagement with the articles in the carton, a switch mounted in the path of the platen and actuated thereby during the final downward movement of the carriage and platen to operate the vacuum valve and apply suction by which the suction cups are attached to the said articles, a second switch mounted in the path of the platen and actuated thereby during the final downward movement of the carriage and platen to energize the lifting motor and lift the carriage and thereby withdraw the inverted articles from the carton, a switch mounted in the path of the carriage and actuated thereby during the final upward movement of the carriage to energize the platen inverting motor and rotate the platen from a downwardly facing position to an upwardly facing position and thereby upright the articles, a switch mounted in the path of the platen and actuated thereby as the platen completes its rotation to operate the vacuum control valve and dissipate the vacuum and thereby release the suction cups, a second switch mounted in the path of the platen and actuated thereby as the platen completes its rotation to energize the pusher motor and actuate the pusher device and thereby remove the articles from the platen, a switch in the path of the pusher device and actuated thereby as the pusher device nears its final forward position to energize the pusher motor and return the pusher device to its original position, a switch mounted in the path of the pusher device and actuated thereby during the final movement to the original position to energize the platen inverting motor and thereby return the platen to its original position.

9. In combination with the apparatus defined in claim 8, automatic means for bringing cartons in succession to the uncasing station, means for arresting the cartons at said station, and automatic means operated by the movement of a carton into uncasing position at said station to initiate the said series of uncasing operations.

10. Apparatus for uncasing jars or other open-mouth containers packed in inverted position within a carton, comprising means for supporting the carton at an uncasing station, a platen mounted for up-and-down movement over the carton at such station, a battery of suction cups mounted on said platen with the open mouths of the cups facing downward and lying in substantially the same horizontal plane, said cups being brought into engagement with the bottom ends of the containers when the platen is lowered, means for applying suction to said cups and thereby attaching the articles to the cups, means for lifting the platen bodily and thereby withdrawing the containers from the carton, means for then rotating the platen about a horizontal axis and thereby uprighting the containers, said platen comprising a face plate having openings through which the suction cups extend, said face plate having its face in a plane parallel with said first mentioned plane, means for holding said face plate in a retracted position while the suction cups are being brought into engagement with the said containers, spring means for applying an outward pressure to the face plate and thereby holding it with a yielding pressure against the end faces of the containers while the containers are held by the suction cups and being rotated to upright position and thereby preventing tilting movement of the containers relative to said plate during the rotation of the platen.

11. Apparatus for uncasing open-mouth ware packed in inverted position within cartons, said apparatus comprising a horizontally travelling conveyor extending through and on opposite sides of an uncasing station and by which a succession of cartons placed on the conveyor are brought singly and in succession to said station, said conveyor comprising flight bars by which the cartons are positively driven by the conveyor, a stop mounted in position to arrest each of the cartons in succession when brought to the uncasing station and thereby arrest the conveyor, a supporting frame, a carriage positioned at said station over the path of the cartons and mounted in the supporting frame for up-and-down movement, a platen pivotally mounted in the carriage for rotation about a horizontal axis, a battery of suction cups supported on the platen, an air operated piston motor mounted on said frame and operatively connected to the carriage for lifting it, an air operated piston motor mounted on the carriage and geared to the platen for rotating it about said axis, the suction cups being brought into engagement with the bottom ends of the said ware by the lowering of the carriage and platen, and withdrawn from the carton by the upward movement of the carriage and uprighted by the rotation of the platen about its said bottom ends, the ware being supported solely at said bottom ends during the uprighting movement, a pusher bar located at one side of the platen, a motor connected to the pusher bar and operative to advance the pusher bar horizontally over the platen, thereby removing the uprighted ware from the platen, automatic means brought into activity by the positioning of a carton at said station for causing the operation of said motors and effecting said movements of the carriage and platen, automatic means for withdrawing said stop after the ware has been withdrawn from a carton.

12. Apparatus for uncasing articles packed in cartons, said apparatus comprising a horizontally travelling conveyor by which the cartons are brought in succession to an uncasing station and carried through and beyond said station, a continuously running motor, means including a friction clutch forming a driving connection between the motor and the conveyor, a stop bar in the path of the cartons in position to arrest each carton at said station and thereby stop the conveyor while the motor continues to run, a carriage, a platen mounted on the carriage, suction devices carried by the platen, said carriage with the platen thereon being mounted for up-and-down movement over the carton at said station, the platen being in position to engage the suction devices with the said articles when the carriage is lowered, power mechanism for lifting and lowering the carriage and for withdrawing the stop bar out of the path of the cartons, automatic control devices for controlling the operation of said power mechanism and including means brought into activity by the movement of the cartons to said uncasing position to effect the operation of said power mechanism, and automatic means for withdrawing the stop bar and thereby causing the empty carton to be advanced by the travelling conveyor following the uncasing operation.

13. Apparatus for uncasing open-mouth containers packed in inverted position in cartons, said apparatus comprising means for supporting a carton at an uncasing station, a carriage mounted for up-and-down movement at said station, a platen pivotally mounted on the carriage for rotation about a horizontal axis with the platen positioned over a carton at said station, a battery of suction cups carried on the platen and facing downwardly with the outer ends of the cups arranged in a horizontal plane, means for lowering and lifting the platen on the carriage and bringing the suction cups into engagement with the upwardly facing bottom ends of the containers and lifting the containers out of the carton, automatic means for applying suction to the cups when the latter are in contact with the containers and thereby holding containers, means for rotating the platen about its axis when the articles have been lifted out of the container and thereby swinging the articles upwardly to an upright position, automatic means for dissipating the suction and releasing the articles when in said upright position, said platen including a supporting plate having openings through which the suction cups extend, means for moving said plate upwardly when the containers are in said upright position and thereby lifting them away from the suction cups, a pusher device positioned at one side of said plate, and means for moving the pusher device laterally over the plate and thereby removing the containers from said plate.

14. The apparatus defined in claim 13, the said means for moving the supporting plate upwardly including springs holding the said plate against the bottom ends of the containers during said swinging movement of the platen and thereby preventing tilting of the containers relative to said plate and suction cups during the uprighting movement of the containers.

15. Apparatus for uncasing open-mouth containers placed in inverted position within a carton, comprising a support for the carton, a platen mounted over said support, a battery of suction cups attached to the platen, said cups having open mouths facing downwardly, means for moving the platen downwardly and bringing said cups into engagement with the upwardly facing bottom ends of the containers, means for then applying suction to said cups and thereby causing them to grip the containers, means for rotating the platen about a horizontal axis and swinging the containers to an upright position while held by the suction cups and supported solely at said bottom ends, said platen including means to hold the containers against tilting movement relative to the suction cups during said uprighting movement, said holding means comprising a holding surface positioned to bear against the peripheral portions of the container ends and during the uprighting movement of the containers.

16. The combination defined in claim 15, said holding means comprising a plate having openings through which the suction cups extend and spring means applying a yielding outward pressure of said plate against said bottom ends during said inverting movement.

17. Apparatus for uncasing open-mouth containers packed in inverted position within a carton, said apparatus comprising a support for the carton, a platen mounted over said support for rotation about a horizontal axis, a battery of open-mouth suction cups consisting of rubber-like material attached to the platen, with said cups facing downwardly, means for bringing said cups into engagement with the upwardly facing bottom ends of the containers, means for applying suction to the cups and thereby causing them to grip the containers, means for moving the platen upward relatively to the carton and thereby withdrawing the containers from the carton while suspended from the suction cups, means for then rotating the platen about its axis and thereby uprighting the containers, the platen including a supporting device for engaging the containers and holding them against tilting movement relative to the platen during said rotation of the platen, and spring means to apply and outward pressure to the containers during said rotation of the platen.

18. Apparatus for uncasing open-mouth containers packed in inverted position within a carton, said apparatus comprising a support for the carton, a platen mounted over said support for rotation about a horizontal axis, a battery of open-mouth suction cups consisting of rubber-like material attached to the platen, with said cups facing downwardly, means for bringing said cups into engagement with the upwardly facing bottom ends of the containers, means for applying suction to the cups and thereby causing them to grip the containers, means for moving the platen upward relatively to the carton and thereby withdrawing the containers from the carton while suspended from the suction cups, means for then rotating the platen about its axis and thereby uprighting the containers, said platen including a supporting plate, and means for automatically moving said supporting plate upwardly relative to the containers after said uprighting movement into position to lift the containers off the suction cups and support the containers.

19. The apparatus defined in claim 18 and in combination therewith, a pusher device mounted at one side of the platen, and means for automatically moving the pusher device horizontally over the platen after the containers are lifted off the suction cups and thereby pushing the containers off said supporting plate.

HUGH T. GRISWOLD.

REFERENCES CITED

The following references are of record in the file of this patent:

UNITED STATES PATENTS

| Number | Name | Date |
| --- | --- | --- |
| 1,016,062 | Bettendorf | Jan. 30, 1912 |
| 1,087,909 | Culley | Feb. 17, 1914 |
| 1,904,720 | Douglass | Apr. 18, 1933 |
| 2,119,725 | Stecher | June 7, 1938 |